Figure 2:
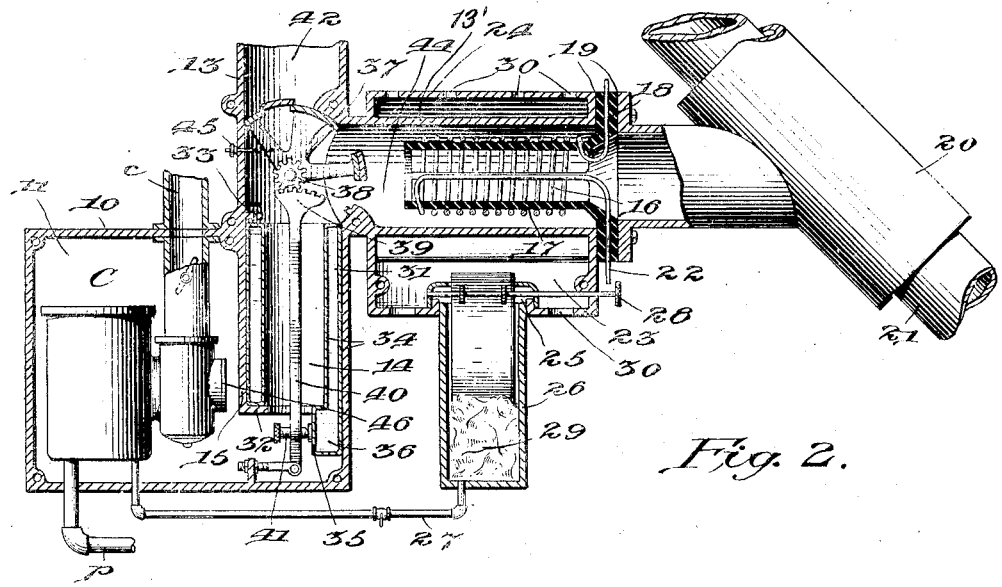

W. G. MILLIGAN.
CARBURETER.
APPLICATION FILED MAR. 22, 1913.

1,246,820.

Patented Nov. 13, 1917.
2 SHEETS—SHEET 1.

Witnesses

Inventor
Williams G. Milligan.
By Edward E. Clement
Attorney

W. G. MILLIGAN.
CARBURETER.
APPLICATION FILED MAR. 22, 1913.

1,246,820.

Patented Nov. 13, 1917.
2 SHEETS—SHEET 2.

Witnesses

Inventor
Williams G. Milligan.

By
Attorney

UNITED STATES PATENT OFFICE.

WILLIAMS GRANT MILLIGAN, OF AKRON, OHIO.

CARBURETER.

1,246,820.  Specification of Letters Patent.  Patented Nov. 13, 1917.

Application filed March 22, 1913. Serial No. 756,164.

*To all whom it may concern:*

Be it known that I, WILLIAMS GRANT MILLIGAN, a citizen of the United States, residing at Akron, in the county of Summit and State of Ohio, have invented a certain new and useful Improvement in Carbureters, of which the following is a specification, reference being had therein to the accompanying drawing.

My invention consists of a carbureter provided with means for heating the air for the fuel mixture and means for heating the body of the carbureter, together with means for maintaining temperature of the air supplied to the fuel mixture and of the body of the carbureter substantially constant irrespective of varying load conditions under which the carbureter operates.

To these ends my invention comprises a carbureter, which may be of any standard form, a housing which completely incloses the body of the carbureter and through which the supply of air for the fuel mixture passes to the carbureter, said housing being separated from the body of the carbureter by air space traversed by the air supplied thereto, means for heating air supplied to said housing, means for supplying cold air to said housing in mixture with the heated air, together with a thermostatic device responsive to variations in temperature of the air mixture supplied to said housing and controlling the proportions of said mixture of cold and heated air.

In the accompanying drawings I illustrate one embodiment of my invention, but it should be understood fully that this invention like all others is susceptible of embodiment in a large number of forms. Thus in the accompanying drawings I also show a modified form of my invention in which the housing for the body of the carbureter is omitted and the regulated mixture of heated and cold air is supplied to the interior of the carbureter for the fuel mixture only. Thus also in the first mentioned embodiment of my invention I make use of a thermostat consisting of a confined liquid body the volume of which varies under the influence of variations in temperature, while in the second embodiment, I make use of a thermostat comprising contiguous, metallic strips of materials having different coefficients of expansion. Any desired form of thermostat may be used, although the liquid thermostat first mentioned as will be seen is possessed of particular advantage. Thus further the character of the means for heating the air may vary within wide limits and in the interests of efficiency or reliabilty. An important part of my invention consists in the structural combination and arrangement of three such means commonly affecting the same air supply. A flame heater, an electric coil, and means for heating from an engine exhaust are the three means provided. The relative positional arrangement, and the extent and contours of the various parts may be widely varied to suit the conditions imposed by the particular standard carbureter proper which is used and the space available for installation of the carbureter.

Referring to the drawings:—

Figure 1:
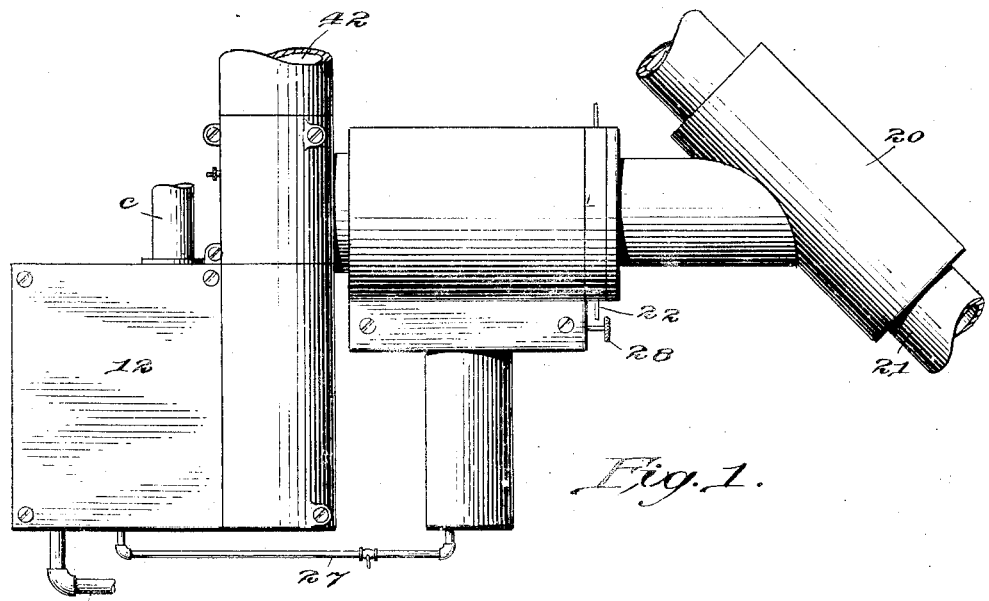
Figure 3:
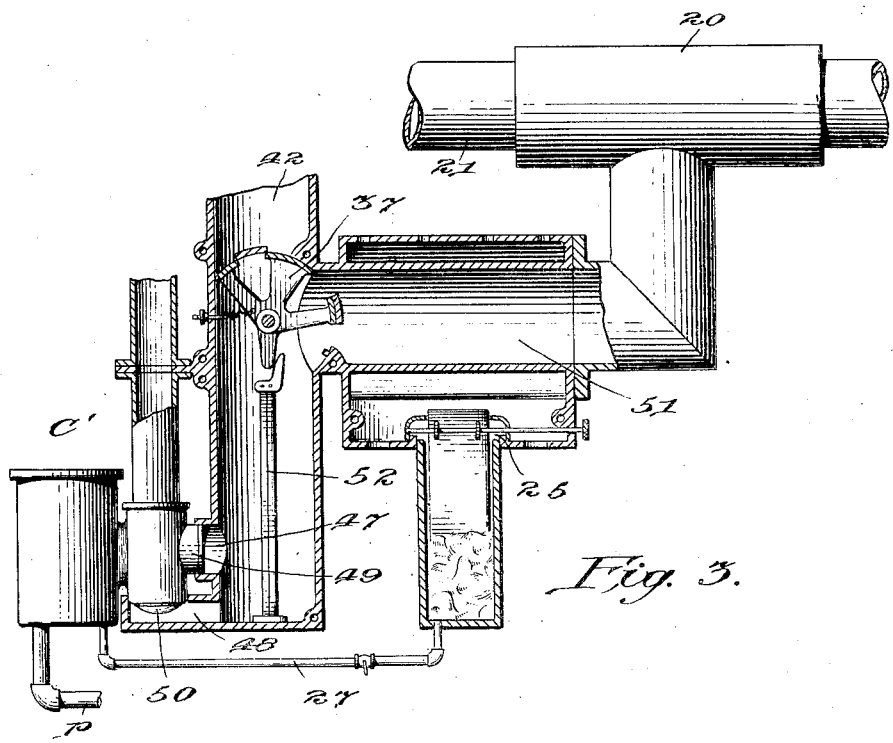

Figure 1 is a side elevation of the principal embodiment of the carbureter of my invention, and Fig. 2 is a central vertical section of the same, while Fig. 3 is a side elevation partly in section of the modified form.

In the forms of Figs. 1 and 2, C (Fig. 2) delineates in outline a standard carbureter of those now in use. This standard carbureter may be in any of the ordinary float feed or other types as far as carburetion in itself is concerned. This carbureter C when connected through conduit *c* with a gas engine or a lighting or heating system will supply a fuel mixture of the proper proportions to meet the demand. The fuel enters the carbureter through fuel pipes *p*, and it will be understood that the carbureter is provided with all of the requisite air and fuel openings in its walls, and all of the necessary adjusting and control devices.

Surrounding the carbureter proper C according to my invention I place a housing 10 separated from the body of the carbureter C by an air space 11. The fuel supply pipe *p*, and all the requisite control devices pass through the walls of the housing 10 through openings in which they make a comparatively snug fit, so that there may not be substantial leakage of air therethrough. The adjustments and controls are not shown, since they vary largely in the different types of carbureters. As clearly appears in Fig. 1 one side wall 12 of the housing is made removable whereby the interior thereof may be readily inspected, and all necessary interior adjustments made. Other parts of the walls of the housing 10 may also be made removable if desired.

An inlet conduit 13 communicates with the interior 11 of the housing 10 through an opening in its top. At the opening, the walls of the housing 10 are provided with a reëntrant portion 15 to form with one end of the housing a partitioned passageway 14 substantially of the same diameter as and co-axial with the inlet conduit 13. The upper end of the inlet conduit 13 has a branch 13' at an angle, and in this portion is supported an electric heating coil 16. This heating coil 16 is carried by an axially extending frame 17 connected with a flange 18 of insulating material. This flange 18 is interposed between the faces of joint 19 between conduit branch 13' and the jacket 20 which surrounds the exhaust pipe 21 of an engine supplied with fuel by the carbureter. The connections 22 with the heating coil 16 are made by conductors which pass through the body of the flange 18 whereby the connections are thoroughly insulated and protected from the metallic conduit walls. The heating coil may be supplied with energy from any suitable battery or dynamo as may be most convenient.

Surrounding that portion of the conduit within which the electric heating coil 16 is located, is a flame heated chamber 23 formed by walls 24 which incase the conduit as shown. Projecting through the bottom of the casing 24 is a liquid fuel burner 25 of the wick type which is fed from a well 26 supplied with fuel through the valve controlled pipe 27 communicating with the well of the carbureter proper C. The wick of the burner 25 may be adjusted by thumb screw 28 which projects without the casing 24. The wick fits the upper part of the well 26 comparatively closely, and all portions of the well 26 not occupied by the wick are stuffed with cotton or other absorbent material 29 whereby flame cannot by any possibility reach back through the well to the carbureter C, and at the same time the feeding of the fuel to the burner 25 is unimpaired. Air openings 30 in the top and bottom respectively of the casing 24 give free circulation of air for the flame of the burner 25. This flame it will be noted impinges directly upon the exterior of the surface of the conduit branch 13' and thus can by no possibility be communicated to the interior of the conduit 13 where it might be carried to the combustible mixture of the carbureter. The electric heater 16 is not designed to reach such a temperature as to ignite foreign substances which might pass through with the air, nor does the exhaust pipe 21 or the jacket 20, in practice, reach such a temperature, and there is therefore no chance whatever of a carbureter explosion or flare up through ignition from the heating means of the air supply.

Located within the reëntrant portion 15 of the carbureter housing 10, is a liquid thermostat 31 retained against the annular shoulder 32 at the bottom of the wall 15 by a set screw 33 passing through a projection extending inwardly from the wall of conduit 13 and bearing on its upper end. This thermostat is tubular in form and contains alcohol or other suitable liquid between its inner and outer tubular walls 34. Under the influence of temperature variations the increase and diminution of volume of the liquid act upon a diaphragm 35 located on the inside of an extension 36 from the body of the thermostat. An oscillating controlling valve 37 is mounted within the conduit 13 and connected by pinion 38 and rack 39 to lever 40 which is adjustably pivoted at its lower end to the housing 10 and bears at one side through adjustable abutment 41 upon the diaphragm 35. The lever 40 passes through the tubular thermostat, the thermostat preferably though not necessarily fitting closely within the reëntrant walls 15.

The conduit 13 is provided with a cold air inlet opening 42. The valve 37 is of the gate type and is made in three segments or sections as shown, though a greater or less number may be used if desired. Valves of this type made in a plurality of sections are sometimes known as the grid-iron type, and have the advantage that a relatively small movement is necessary to fully open or close the valve. This valve is positioned in conduit 13 so that it may oscillate through intermediate positions to a position in which it closes completely the heated air inlet 44 of the conduit 13, the sections of the valve seat extending across inlet opening 44 in the same manner as they extend across conduit 13. A spring 45 adjustably connected between the wall of conduit 13 and the valve 37 normally holds the valve in the full line position shown in which the cold air opening 42 is completely closed.

In operation, my invention functions to maintain the temperature of the air supplied to the housing 10 and to the carbureter C for the fuel mixture at a substantial constant degree irrespective of the load upon the carbureter C. Through the adjustments connected with the pivot of the lever 40 and the abutment 41, (which may be readily made by removing the side 12 of the housing) the degree of this constant temperature may be set at will. Thereafter upon rise of temperature, the liquid of the carbureter 31 is expanded, and the diaphragm 35 moved outwardly to operate upon lever 40 to move the valve 37 to the right to close partially the heated air inlet 44 and correspondingly open the cold air inlet 42. The valve 37 is moved to the right until the proportion of the cold air of the mixture which passes through the tubular thermostat 31 is sufficient to reduce the temperature to the set valve, whereupon the liquid in the thermostat 31 decreases in volume, the diaphragm 35 falls back, and the spring 45 is permitted to return valve 37 toward the left to reduce the amount of cold air being admitted. Thus, the liquid in the thermostat being very sensitive to temperature changes, the valve 37 is kept oscillating right and left as long as there is variation of temperature, and whenever there is variation of temperature, to vary the proportions of the hot and cold air of the mixtures which passes through to the air space 11 of the housing 10. The mixture of the hot and cold air takes place immediately surrounding the valve 37, and the cold air opening 42 and hot air opening 44 being at right angles to each other the mixture is more or less thorough just at this point, but any suitable baffles or other well known mixing devices may be located at this point or within the thermostat 31 to facilitate the thorough mixture prior to the passage of the air from the thermostat. As far as the thermostat itself is concerned however, the thoroughness of the mixture is not of such great importance, for the reason that the resultant pressure of the liquid of the thermostat is at all times proportional combinedly to the average temperature of air in contact with its walls.

The air passing through the space 11 of the housing 10 contacts with the exterior walls of the body of the carbureter C and heats the same, thence passing through the air inlet opening of the carbureter C, as for instance at 46, and enters the carbureter where it forms a part of the fuel mixture. Obviously through this heating of both exterior and interior of the carbureter to the same temperature, the entire body and contents of the carbureter are brought to an even temperature. Preferably the point of introduction of the air to the housing 10 (as for instance the lower end of the reëntrant portion 15) is removed from the air inlet opening 46, whereby a complete traverse of the air space 11 is accomplished before the heated air passes to the interior of the carbureter.

Such and simple is the operation of the invention, but its advantages are many. It is a well known fact that carbureters when adjusted to operate at one temperature, do not operate as well, if at all satisfactorily, at any other temperature. Through my invention, the proper operating temperature of the carbureter may be maintained both inside and outside of the carbureter at a substantially constant value irrespective of existing weather conditions and the temperature of the outside air. Any one, any two, or all three of the heating means associated with the conduit 13 may be going at the same time, and the temperature of the outside air which enters through the cold air opening 42 may be widely different from a defined normal, but the interior temperature of the housing 10 and the carbureter C will be maintained at the same substantially constant degree. The resulting fuel mixture, if the carbureter itself is properly adjusted, is as perfect as is possible to make a fuel mixture. The capacity of any given carbureter is considerably higher when it operates under proper temperature conditions, and the capacity of the carbureter of my invention is therefore a maximum at all times.

Owing to the heating of the major portion of the air which enters the carbureter, such small amounts of moisture as may find entrance are quickly vaporized and do not have opportunity to condense in their short passage through the heated body of the carbureter proper.

When used in connection with a gas engine, at the starting the exhaust pipe 21 is of course too cold to supply the requisite amount of heat. In such case the flame burner 25 or the electric heating coil 16 may be used. In fact these two heating devices may be kept going when the engine is stopped whereby the carbureter is constantly in good operating condition. When either the burner 25 or the heating coil 16 is left on during operation, it supplements the heating action of the exhaust 21, and the loss of energy through that source is comparatively small.

The modification shown in Fig. 3 differs from that of Figs. 1 and 2 in that air having the temperature thus regulated is supplied directly and exclusively through conduits 47 and 48 with the air openings 49 and 50 of a standard carbureter C'. Conduits 47 and 48 are fed from a common air inlet conduit 51 the outer end of which carries the exhaust jacket 20 surrounding the exhaust pipe 21. Cold air inlet opening 42 is located on one side of this pipe, and valve 37 is controlled from a metallic thermostat 52 through the lever connection shown. The electric heating coil is omitted, (though it may be supplied if desired) and the flame burner 25 which heats the exterior of the conduit 51 in advance of the valve 37 is used alone. This burner 25 is fed through a supply pipe 27 from any desired source such for instance as the fuel tank. If the carbureter C' is elevated of course the burner 25 may be fed from the well of the carbureter, as in Fig. 2. It will be understood of course that the level of the fuel in the well or in the tank as the case may be should be below the top of the well 26 of the flame burner 25 whereby flooding of the burner 25 cannot take place.

Having thus described my invention what I claim and desire to secure by Letters Patent is:

1. In combination a float feed carbureter, an air supply conduit therefor, a liquid fuel burner adapted to heat the air supplied to said carbureter through said conduit, and a liquid fuel connection from the well of said carbureter to said burner, whereby the level of the fuel in the burner is maintained by the float of the carbureter.

2. In combination, a carbureter, an air admission conduit therefor, an electric heating coil within said conduit, and a flame heating means on the exterior thereof and an engine exhaust heating means on the outer end thereof communicating with the interior thereof, said conduit having a cold air inlet between said several heating means and the carbureter, and a single valve device for varying the relative proportions of air supplied said conduit through said cold air inlet and by way of said several heating devices.

3. In combination, a carbureter, an air admission conduit therefor, an electric heating coil within said conduit, and a flame heating means without said conduit and positioned to heat the same and an engine exhaust heating means on the outer end thereof communicating with the interior thereof.

In testimony whereof I affix my signature in presence of two witnesses.

WILLIAMS GRANT MILLIGAN.

Witnesses:
   Thos. F. Gorman,
   C. W. Anderson.